(12) United States Patent
Kim et al.

(10) Patent No.: US 12,412,502 B2
(45) Date of Patent: Sep. 9, 2025

(54) DISPLAY COMPENSATION DEVICE AND DISPLAY COMPENSATION METHOD

(71) Applicant: LG Display Co., Ltd., Seoul (KR)

(72) Inventors: DongGwi Kim, Gimcheon-si (KR); YeonKwan Jung, Paju-si (KR); Minho Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 26 days.

(21) Appl. No.: 18/522,795

(22) Filed: Nov. 29, 2023

(65) Prior Publication Data

US 2024/0242654 A1    Jul. 18, 2024

(30) Foreign Application Priority Data

Jan. 12, 2023    (KR) .......... 10-2023-0004985

(51) Int. Cl.
G09G 3/20         (2006.01)
G06T 7/00         (2017.01)
G09G 3/3225       (2016.01)

(52) U.S. Cl.
CPC .......... *G09G 3/2007* (2013.01); *G06T 7/97* (2017.01); *G09G 3/3225* (2013.01); *G09G 2300/0819* (2013.01); *G09G 2300/0842* (2013.01); *G09G 2320/0233* (2013.01); *G09G 2320/045* (2013.01); *G09G 2330/021* (2013.01)

(58) Field of Classification Search
CPC .......... G06T 7/97; G09G 3/3225; G09G 2300/0819; G09G 2320/0233; G09G 2330/021; G09G 2300/0842; G09G 2320/045
See application file for complete search history.

(56) References Cited

U.S. PATENT DOCUMENTS

| | | | |
|---|---|---|---|
| 2010/0045815 A1* | 2/2010 | Tsuchiya | H04N 23/698 382/209 |
| 2011/0254976 A1* | 10/2011 | Garten | G06F 3/1454 348/E5.037 |
| 2021/0125577 A1* | 4/2021 | Hong | G09G 3/2003 |
| 2021/0383736 A1* | 12/2021 | Hong | G09G 3/3233 |

* cited by examiner

*Primary Examiner* — Shaheda A Abdin
(74) *Attorney, Agent, or Firm* — Seed Intellectual Property Law Group LLP

(57) ABSTRACT

A display compensation device and display compensation method according to embodiments of the disclosure may generate first compensation data based on a first photographed image produced by photographing a first display image displayed on a display panel, generate second compensation data based on a second photographed image produced by photographing a second display image displayed on the display panel, and generate reference compensation data including the first compensation data and the second compensation data, generating accurate reference compensation data.

18 Claims, 11 Drawing Sheets

S-MODE

Vsen Wave

F-MODE

Vsen Wave

DISPLAY COMPENSATION DEVICE AND DISPLAY COMPENSATION METHOD

CROSS-REFERENCE TO RELATED APPLICATION

This application claims priority from Korean Patent Application No. 10-2023-0004985, filed on Jan. 12, 2023, which is hereby incorporated by reference for all purposes as if fully set forth herein.

BACKGROUND

Technical Field

Embodiments of the disclosure relate to a display compensation device and a display compensation method.

Description of the Related Art

As display technology or display application technology develops, various types of display devices for displaying images are being developed. For example, different types of display devices may include liquid crystal displays (LCDs), organic light-emitting display devices, quantum dot display devices, micro light-emitting diode display devices, micro-LED display devices, and the like.

In organic light-emitting display devices among the display devices, the characteristics of the elements constituting the plurality of subpixels disposed on the display panel may not be uniform due to various factors, such as process deviations and/or material property deviations. As such, device characteristic deviations between subpixels may cause luminance deviations between subpixels, resulting in image glitches. For example, device characteristic deviations between subpixels may include threshold voltage deviations between light emitting elements, threshold voltage deviations between transistors, mobility deviations between transistors, and the like.

Accordingly, the display device may compensate for the image data and drive the display panel so that the display panel does not produce screen glitches.

BRIEF SUMMARY

The inventors recognized that it is beneficial to accurately generate reference compensation data that accurately reflects the panel state at the time of manufacturing the panel. However, a variety of unexpected conditions or circumstances may cause screen glitches which may take various forms. As a result, there are significant challenges in generating reference compensation data that accurately reflects the state of the panel at the time the panel is manufactured. Embodiments of the disclosure may provide a display compensation device and display compensation method capable of accurately generating reference compensation data that accurately reflects the panel state at the time of manufacturing the panel.

Embodiments of the disclosure may provide a display compensation device and display compensation method capable of generating reference compensation data capable of reducing or eliminating screen glitches in the display panel at the time of manufacturing the panel.

Embodiments of the disclosure may provide a display compensation device and display compensation method having a high performance rate when performing display compensation processing for a plurality of display devices.

A display compensation device according to embodiments of the disclosure may include an image acquisition module that obtains a photographed image by photographing the display image displayed on the display panel and a compensation processing module that generates the compensation data for compensating for the image data for driving the display panel based on the photographed image.

The compensation processing module may generate first compensation data based on a first photographed image produced by photographing a first display image displayed on the display panel, generate second corrected photographed image data by correcting second photographed image data for a second photographed image produced by photographing a second display image displayed on the display panel and generating second compensation data based on the second corrected photographed image data, and generate reference compensation data including the first compensation data and the second compensation data.

The display compensation device according to embodiments of the disclosure may further comprise a storage processing module storing the reference compensation data in a memory associated with the display panel.

The compensation processing module of the display compensation device according to embodiments of the disclosure may obtain difference data between per-subpixel group compensation data and per-subpixel compensation data for displaying the second display image on the display panel using the first compensation data, obtain per-subpixel group enhanced compensation data produced by modifying the per-subpixel group compensation data based on the difference data, generate the second corrected photographed image data by correcting the second photographed image data based on the per-subpixel group enhanced compensation data, and generate the second compensation data based on the second corrected photographed image data.

The first display image may be an image having a predetermined first grayscale, and the second display image may be an image having a second grayscale different from the first grayscale.

The second grayscale may be lower than the first grayscale.

The second grayscale may be included in a previously determined extremely low grayscale range.

The first compensation data may include the gain and first offset computed on the image data.

The second compensation data may include a second offset computed on the image data.

The compensation processing module may operate only when the first display image displayed on the display panel includes a blotch.

A display compensation method according to embodiments of the disclosure may comprise a first step of generating first compensation data including a gain and a first offset based on a first photographed image produced by photographing a first display image displayed on a display panel, a second step of generating second compensation data based on a second photographed image produced by photographing a second display image, different from the first display image, displayed on the display panel, and a third step of generating reference compensation data including the first compensation data and the second compensation data.

The first step, the second step, and the third step included in the display compensation method according to embodiments of the disclosure may be performed only when the first display image displayed on the display panel contains a blotch.

The second step may include obtaining per-subpixel group compensation data and per-subpixel compensation data for displaying the second display image on the display panel using the first compensation data, producing difference data between the per-subpixel group compensation data and the per-subpixel compensation data, producing per-subpixel group enhanced compensation data produced by modifying the per-subpixel group compensation data based on the difference data, generating second corrected photographed image data by correcting the second photographed image data for the second photographed image obtained by photographing the second display image displayed on the display panel, based on the per-subpixel group enhanced compensation data, and generating the second compensation data based on the second corrected photographed image data.

The first display image may be an image having a predetermined first grayscale, and the second display image is an image having a second grayscale lower than the first grayscale.

The second grayscale may be included in a previously determined extremely low grayscale range.

The first compensation data may include a gain and a first offset.

The second compensation data may include a second offset.

The display compensation method according to embodiments of the disclosure may further comprise a fourth step of storing the reference compensation data in a memory of a display device including the display panel.

embodiments of the disclosure may repeatedly perform compensation data generation processing to finally generate the reference compensation data, which presents the effect of accurately generating the reference compensation data that accurately reflects the state of the panel at the time the panel is manufactured.

Embodiments of the disclosure have the effect of generating reference compensation data that may reduce or eliminate screen glitches in the display panel by generating reference compensation data using images at various grayscales, including an extremely low grayscale range where screen abnormalities are induced.

Embodiments of the disclosure may accurately generate reference compensation data to eliminate screen glitches, thereby significantly reducing the number of discarded display panels while increasing the yield of high-quality display panels.

Embodiments of the disclosure may increase the yield of high-quality display panels for the same material input, thereby saving production energy and power consumption when manufacturing the display devices and hence leading to low power consumption and process optimization.

Embodiments of the disclosure may selectively perform the display compensation processing only for the display devices in which the screen smudge occurs, thereby saving power and increasing performance rate when performing display compensation processing on a plurality of display devices.

DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
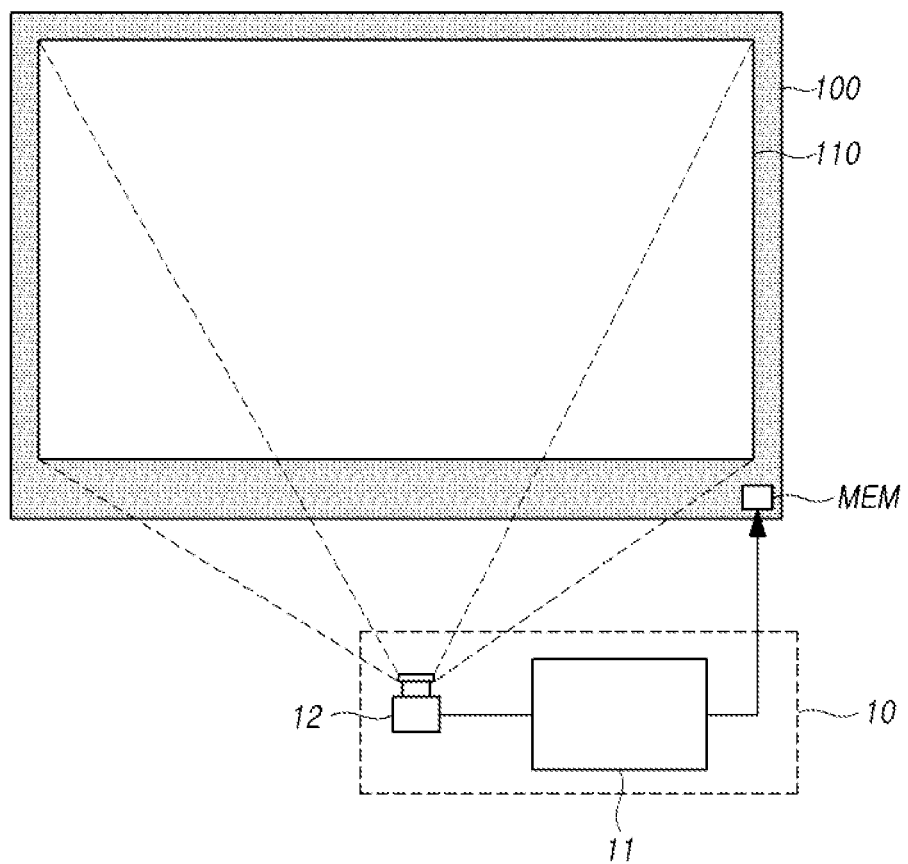
FIG. 1 illustrates a display compensation system according to embodiments of the disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a," "an," and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected," "coupled" or "linked", the two or more components may be directly "connected," "coupled" or "linked ", or another component may intervene. Here, the other component may be included in one or more of the two or more components that are "connected," "coupled" or "linked" to each other.

When such terms as, e.g., "after," "next to," "after," and "before," are used to describe the temporal flow relationship related to components, operation methods, and fabricating methods, it may include a non-continuous relationship unless the term "immediately" or "directly" is used. The term "predetermined" refers to that a value, a parameter, a setting, a threshold, a condition, etc., is determined before it is used in an operation. A "predetermined" value, parameter, setting, threshold, or condition can be dynamically determined or adjusted in the operation of a machine, automatically with or without user inputs. The term "predetermined" does not mean or limit to that a value, a parameter, a setting, a threshold, a condition, etc., is fixed or is input by a user.

Meanwhile, if a numerical value or its corresponding information (e.g., level, etc.) is mentioned for a component, it may be interpreted that the numerical value or its corresponding information includes a margin of error that may be caused by various factors (e.g., process factors, internal or external shocks, noise, etc.), even if it is not explicitly stated otherwise.

Hereinafter, various embodiments of the disclosure are described in detail with reference to the accompanying drawings.

FIG. 1 illustrates a display compensation system 10 according to embodiments of the disclosure.

Referring to FIG. 1, a display compensation system 10 according to embodiments of the disclosure may inspect the screen state of the display panel 110 of the display device 100 and provide software-wise (or firmware-based or hardware logic-based) display compensation capability to remove a screen glitch, such as screen blotches.

The display compensation system 10 according to embodiments of the disclosure may perform the display compensation function of generating reference compensation data for correcting the image data to be suitable for the state of the display panel 110 (the state at the time the panel is manufactured) so as to prevent screen glitch in the display panel 110 and storing the reference compensation data in the memory MEM of the display device 100.

Referring to FIG. 1, the display compensation system 10 may include a display compensation device 11 and a camera device 12.

The camera device 12 may photograph the image displayed on the display panel 110 of the display device 100 to be inspected and output the photographed image to the display compensating device 11. Hereinafter, to distinguish the image displayed on the display panel 110 from the image photographed by the camera device 120, the image displayed on the display panel 110 is denoted as a display image, and the image photographed by the camera device 120 is denoted as a photographed image.

The display compensation device 11 may obtain the photographed image from the camera device 12, generate reference compensation data based on the photographed image, and store the reference compensation data in the memory MEM of the display device 100.

The display compensation device 11 may control the operation of at least one of the display device 100 and the camera device 12 to perform the display compensation function. For example, the display compensation device 11 may repeatedly display display images of various grayscales on the display panel 110 for more accurate display compensation processing.

The reference compensation data, generated by the display compensation device 11 and stored in the memory MEM, may be used when the display device 100 drives the display.

Referring to FIG. 1, the display compensation device 11 and the camera device 12 included in the display compensation system 10 according to embodiments of the disclosure may be configured as separate devices or may be integrated and configured as one device.

Referring to FIG. 1, in the display compensation system 10 according to embodiments of the disclosure, the display compensation device 11 and the display device 100 may be connected by a wired cable or via a wireless interface such as Bluetooth or wireless LAN, or may be connected via a wired or wireless network.

The display device 100 requiring the display compensation function according to embodiments of the disclosure is briefly described below, followed by the description of the display compensation device 110 and display compensation method according to embodiments of the disclosure.

Figure 2:
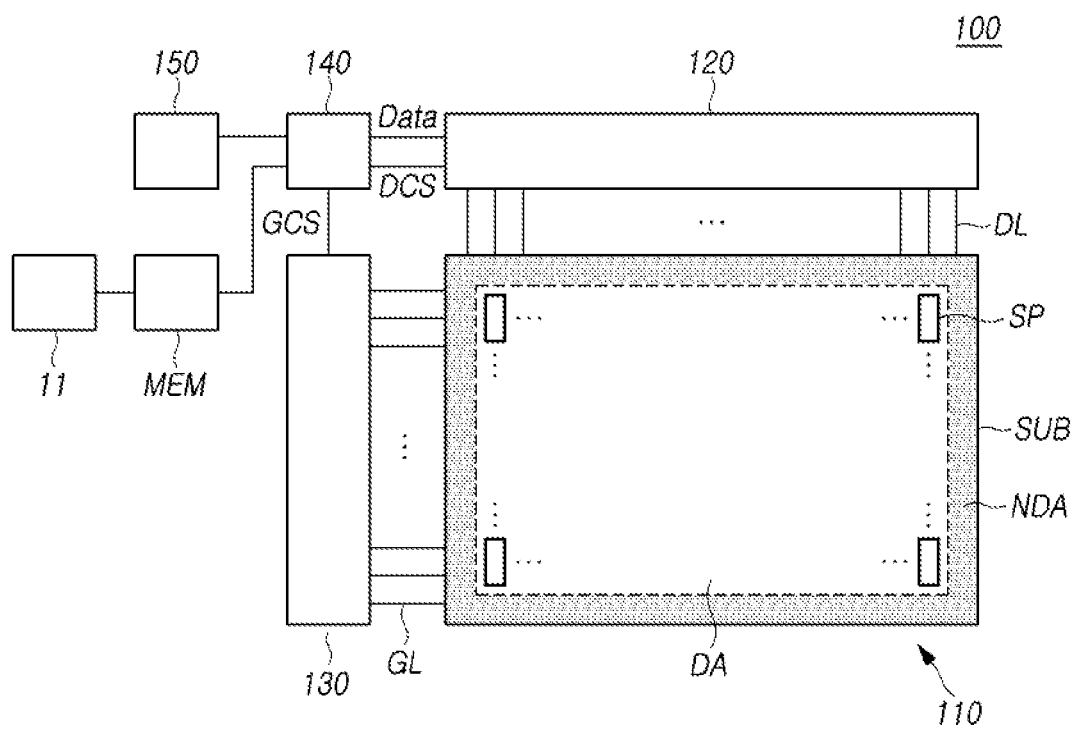
FIG. 2 illustrates a display device according to embodiments of the disclosure.

FIG. 2 illustrates a display device 100 according to embodiments of the disclosure.

Referring to FIG. 2, a display device 100 may include a display panel 110 and a driving circuit for driving the display panel 110. The driving circuits may include a data driving circuit 120 and a gate driving circuit 130. The display device 100 may further include a controller 140 controlling the data driving circuit 120 and the gate driving circuit 130.

Referring to FIG. 2, the display device 100 may include a memory MEM for storing the reference compensation data provided from the display compensation device 11. The memory MEM may be configured outside the controller 140 or may be an internal memory configured inside the controller 140.

Referring to FIG. 2, the display panel 110 may include a substrate SUB and signal lines, such as a plurality of data lines DL and a plurality of gate lines GL disposed on the substrate SUB. The display panel 110 may include a plurality of subpixels SP connected to the plurality of data lines DL and the plurality of gate lines GL.

Referring to FIG. 2, the display panel 110 may include a display area DA in which images are displayed and a non-display area NDA in which no image is displayed. In the display panel 110, a plurality of subpixels SP for displaying images may be disposed in the display area DA, and the driving circuits 120, 130, and 140 may be electrically connected or disposed in the non-display area NDA. Further, pad units for connection of integrated circuits or a printed circuit may be disposed in the non-display area NA.

Referring to FIG. 2, the data driving circuit 120 is a circuit for driving the plurality of data lines DL, and may supply data signals to the plurality of data lines DL.

Referring to FIG. 2, the gate driving circuit 130 is a circuit for driving the plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

Referring to FIG. 2, the controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system 150), various timing signals including a vertical synchronization signal VSYNC, a horizontal synchronization signal HSYNC, an input data enable signal DE, and a clock signal, along with the input image data.

To control the data driving circuit 120 and the gate driving circuit 130, the controller 140 receives timing signals, such as the vertical synchronization signal VSYNC, horizontal synchronization signal HSYNC, input data enable signal DE, and clock signal CLK, generates various control signals DCS and GCS, and outputs the control signals to the data driving circuit 120 and the gate driving circuit 130.

As an example, to control the gate driving circuit 130, the controller 140 outputs various gate control signals GCS including a gate start pulse GSP, a gate shift clock GSC, and a gate output enable signal (Gate Output Enable, GOE).

To control the data driving circuit 120, the controller 140 outputs various data control signals DCS including, e.g., a source start pulse SSP, a source sampling clock SSC, and a source output enable signal (Source Output Enable, SOE).

The controller 140 may be implemented as a separate component from the data driving circuit 120, or the controller 140, along with the data driving circuit 120, may be implemented as an integrated circuit.

The data driving circuit 120 receives the image data Data from the controller 140 and supply data voltages to the plurality of data lines DL, thereby driving the plurality of data lines DL. The data driving circuit 120 is also referred to as a 'source driving circuit.'

The data driving circuit 120 may include one or more source driver integrated circuit (SDICs).

Each source driver integrated circuit (SDIC) may include a shift register, a latch circuit, a digital-to-analog converter (DAC), and an output buffer. In some cases, each source driver integrated circuit (SDIC) may further include an analog-digital converter ADC.

For example, each source driver integrated circuit (SDIC) may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110. The gate driving circuit 130 may be disposed on the substrate SUB or may be connected to the substrate SUB. In other words, the gate driving circuit 130 that is of a GIP type may be disposed in the non-display area NDA of the substrate SUB. The gate driving circuit 130 that is of a chip-on-glass (COG) type or chip-on-film (COF) type may be connected to the substrate SUB.

Meanwhile, at least one of the data driving circuit 120 and the gate driving circuit 130 may be disposed in the display area DA. For example, at least one of the data driving circuit 120 and the gate driving circuit 130 may be disposed not to overlap the subpixels SP or to overlap all or some of the subpixels SP.

When a specific gate line GL is opened by the gate driving circuit 130, the data driving circuit 120 may convert the image data Data received from the controller 140 into an analog data voltage and supply it to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI).

The controller 140 may include a storage medium, such as one or more registers.

The display device 100 according to embodiments of the disclosure may be a display including a backlight unit, such as a liquid crystal display, or may be a self-emission display, such as an organic light emitting diode (OLED) display, a quantum dot display, or a micro light emitting diode (LED) display.

If the display device 100 according to embodiments of the disclosure is an OLED display, each subpixel SP may include an organic light emitting diode (OLED), which by itself emits light, as the light emitting element. If the display device 100 according to embodiments of the disclosure is a quantum dot display, each subpixel SP may include a light emitting element formed of a quantum dot, which is a self-luminous semiconductor crystal. If the display device 100 according to embodiments of the disclosure is a micro LED display, each subpixel SP may include a micro LED, which is self-emissive and formed of an inorganic material, as the light emitting element.

Figure 3A:
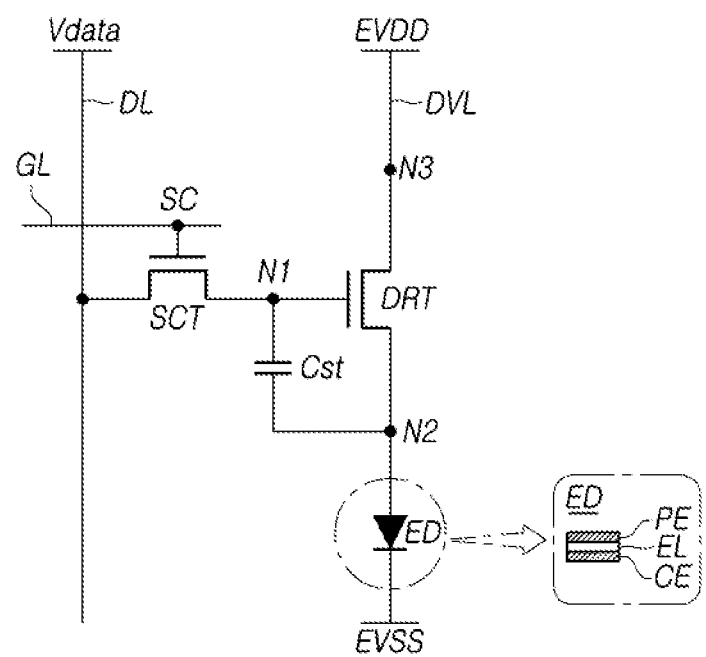
FIGS. 3A and 3B are equivalent circuit diagrams illustrating a subpixel of a display device according to embodiments of the disclosure.
Figure 3B:
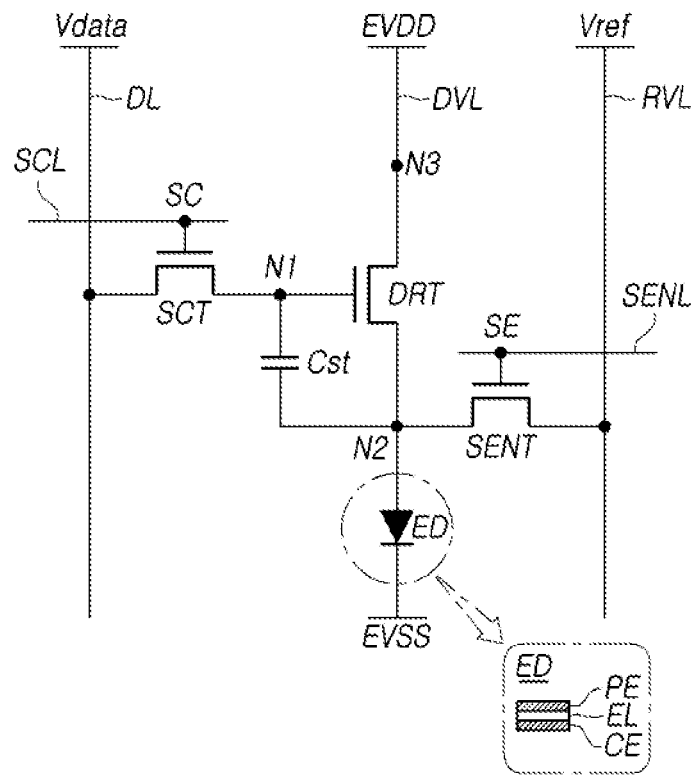

FIGS. 3A and 3B are equivalent circuit diagrams illustrating a subpixel SP of a display device 100 according to embodiments of the disclosure.

Referring to FIG. 3A, each of a plurality of subpixels SP disposed on a display panel 110 of a display device 100 according to embodiments of the disclosure may include a light emitting element ED, a driving transistor DRT, a scan transistor SCT, and a storage capacitor Cst.

The light emitting element ED may include a pixel electrode PE and a common electrode CE and may include a light emitting layer EL positioned between the pixel electrode PE and the common electrode CE.

The pixel electrode PE of the light emitting element ED may be an electrode disposed in each subpixel SP, and the common electrode CE may be an electrode commonly disposed in all the subpixels SP. Here, the pixel electrode PE may be an anode electrode, and the common electrode CE may be a cathode electrode. Conversely, the pixel electrode PE may be a cathode electrode, and the common electrode CE may be an anode electrode.

For example, the light emitting element ED may be an organic light emitting diode (OLED), an inorganic light emitting diode (LED), or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED. The third node N3 of the driving transistor DRT may be electrically connected with a driving voltage line DVL supplying a driving voltage EVDD.

The scan transistor SCT may be controlled by a scan signal SC, which is a type of gate signal, and may be connected between the first node N1 of the driving transistor DRT and the data line DL. In other words, the scan transistor SCT may be turned on or off according to the scan signal SC supplied from the scan signal line SCL, which is a type of the gate line GL, controlling the connection between the data line DL and the first node N1 of the driving transistor DRT.

The scan transistor SCT may be turned on by the scan signal SC having a turn-on level voltage and transfer the data voltage Vdata supplied from the data line DL to the first node N1 of the driving transistor DRT.

If the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

The storage capacitor Cst may be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

Referring to FIG. 3B, each of the plurality of subpixels SP disposed on the display panel 110 of the display device 100 according to embodiments of the disclosure may further include a sensing transistor SENT.

The sensing transistor SENT may be controlled by a sense signal SE, which is a type of gate signal, and may be connected between the second node N2 of the driving transistor DRT and the reference voltage line RVL. In other words, the sensing transistor SENT may be turned on or off according to the sense signal SE supplied from the sense signal line SENL, which is another type of the gate line GL, controlling the connection between the reference voltage line RVL and the second node N2 of the driving transistor DRT.

The sensing transistor SENT may be turned on by the sense signal SE having a turn-on level voltage and transfer a reference voltage Vref supplied from the reference voltage line RVL to the second node N2 of the driving transistor DRT.

The sensing transistor SENT may be turned on by the sense signal SE having a turn-on level voltage, transferring the voltage of the second node N2 of the driving transistor DRT to the reference voltage line RVL. If the sensing transistor SENT is an n-type transistor, the turn-on level voltage of the sense signal SE may be a high level voltage. If the sensing transistor SENT is a p-type transistor, the turn-on level voltage of the sense signal SE may be a low level voltage.

The function in which the sensing transistor SENT transfers the voltage of the second node N2 of the driving transistor DRT to the reference voltage line RVL may be used upon driving to sense the characteristic value of the subpixel SP. In this case, the voltage transferred to the reference voltage line RVL may be a voltage for calculating the characteristic value of the subpixel SP or a voltage reflecting the characteristic value of the subpixel SP.

In the disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. In the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The scan signal line SCL and the sense signal line SENL may be different gate lines GL. In this case, the scan signal SC and the sense signal SE may be separate gate signals, and the on-off timings of the scan transistor SCT and the on-off timings of the sense transistor SENT in one subpixel SP may be independent. In other words, the on-off timings of the scan transistor SCT and the on-off timings of the sensing transistor SENT in one subpixel SP may be the same or different.

Alternatively, the scan signal line SCL and the sense signal line SENL may be the same gate line GL. In other words, the gate node of the scan transistor SCT and the gate node of the sensing transistor SENT in one subpixel SP may be connected with one gate line GL. In this case, the scan signal SC and the sense signal SE may be the same gate signals, and the on-off timings of the scan transistor SCT and the on-off timings of the sense transistor SENT in one subpixel SP may be the same.

The structures of the subpixel SP shown in FIGS. 3A and 3B are merely examples, and various changes may be made thereto, e.g., such as including one or more transistors or one or more capacitors. Although the subpixel structure is described in connection with FIGS. 3A and 3B under the assumption that the display device 100 is a self-emission display device, if the display device 100 is a liquid crystal display, each subpixel SP may include a transistor and a pixel electrode according to a general structure.

Meanwhile, the light emitting elements ED and/or transistors DRT, SCT, and SENT disposed on the display panel 110 may not have the same characteristic values for various reasons, such as material characteristics and process deviations, but may have characteristic value deviations. In this case, a luminance deviation between the plurality of subpixels SP may occur, resulting in image quality degradation, such as screen blotches and image unevenness.

Thus, the display device 100 may compensate for the image data and drive the display panel 110 so that the display panel 110 does not produce screen glitches, such as screen blotches, image unevenness, and the like. Accordingly, it may be critical to generate reference compensation data that accurately reflects the state of the display panel 110 at the time the display panel 110 is manufactured.

Accordingly, the display compensation system 10 according to embodiments of the disclosure is a system for accurately generating reference compensation data that accurately reflects the state of the display panel 110 at the time the display panel 110 is manufactured.

Figure 4:
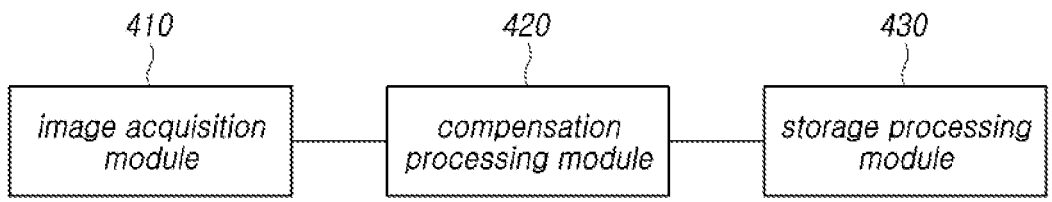
FIG. 4 is a block diagram illustrating a display compensation device according to embodiments of the disclosure.
Figure 5:
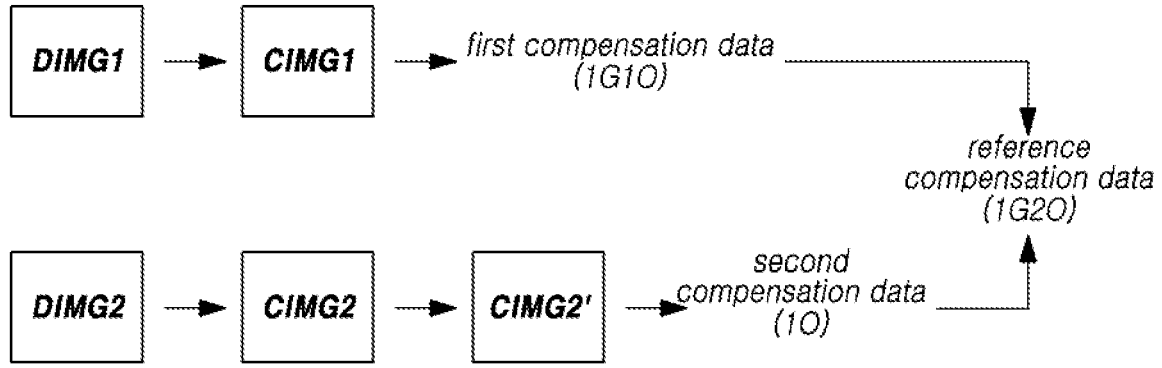
FIG. 5 is a diagram schematically illustrating a display compensation scheme according to embodiments of the disclosure.

FIG. 4 is a block diagram illustrating a display compensation device 11 according to embodiments of the disclosure. FIG. 5 is a diagram briefly illustrating a display compensation scheme according to embodiments of the disclosure.

Referring to FIG. 4, the display compensation device 11 according to embodiments of the disclosure may include an image acquisition module 410 that obtains a photographed image by photographing the display image displayed on the display panel 110 and a compensation processing module 420 that generates the compensation data for compensating for the image data for driving the display panel 110 based on the photographed image.

The image acquisition module 410 may receive the photographed image from the camera device 12. The image acquisition module 410 may control the operation of the camera device 12 under the control of the compensation processing module 420.

Referring to FIGS. 4 and 5, the compensation processing module 420 may generate first compensation data based on a first photographed image CIMG1 obtained by photographing the first display image DIMG1 displayed on the display panel 110.

Referring to FIGS. 4 and 5, the compensation processing module 420 may generate second corrected photographed image data CIMG2' by correcting second photographed image data for a second photographed image CIMG2 obtained by photographing second display image DIMG2 displayed on the display panel 110 and generate second compensation data based on the second corrected photographed image data CIMG2'.

Referring to FIGS. 4 and 5, the compensation processing module 420 may generate reference compensation data including the first compensation data and the second compensation data.

Referring to FIG. 4, the display compensation device 11 according to embodiments of the disclosure may further include a storage processing module 430 that stores the reference compensation data in the memory MEM associated with the display panel 110.

When storing the reference compensation data in the memory MEM, the storage processing module 430 may compress and store the reference compensation data in a predetermined compression scheme. Here, the compression scheme may include at least one of a lossy compression scheme and a lossless compression scheme. For example, the compression scheme may vary depending on the type of data to be compressed in the reference compensation data and may vary depending on the type or specifications of the display device 100.

Referring to FIGS. 4 and 5, the compensation processing module 420 may use the first compensation data to obtain difference data between the per-subpixel group compensation data and the per-subpixel compensation data for displaying the second display image DIMG2 on the display panel 110. For example, the per-subpixel group compensation data and the per-subpixel compensation data may be changed image data produced by applying the first compensation data (gain or first offset) to the image data. In this case, the changed image data may be data produced by multiplying the image data by the gain and then adding the first offset.

Referring to FIGS. 4 and 5, the compensation processing module 420 may obtain per-subpixel group enhanced compensation data produced by modifying the per-subpixel group compensation data based on the obtained difference data and correct the second photographed image data based on the obtained per-subpixel group enhanced compensation data to generate second corrected photographed image data CIMG2'.

Referring to FIGS. 4 and 5, the compensation processing module 420 may generate second compensation data based on the second corrected photographed image data CIMG2'.

The first display image DIMG1 may be an image having one or more predetermined first grayscales, and the second display image DIMG2 may be an image having a second grayscale different from the first grayscale.

For example, the second grayscale may be lower than the first grayscale.

For a more specific example, the second grayscale may be a grayscale included in a previously determined extremely low grayscale range.

For example, For example, one or more first grayscales may include one or more grays having values in tens and one or more grays having values in hundreds of hundreds. one or more first grayscales may include one or more grays with a value ranging from 10 to 99 and one or more grays with a value ranging from 100 to 999. The extremely low grayscale range may be about gray 30 or less. For example, gray 10 or gray 12 may fall within the extremely low grayscale range.

The first compensation data may include the gain and first offset computed on the image data. In other words, the first compensation data may be data (1G1O) that includes one gain (1G) which is multiplied with the image data and one first offset (1O) which is added to the image data.

Each of the first compensation data and the second compensation data may be compensation data that exists, one in each of a plurality of subpixel groups. Each of the plurality of subpixel groups may include subpixels in m rows and n columns. At least one of m and n may be a natural number of 2 or greater, and the other may be a natural number of 1 or greater.

Accordingly, the compensation data respectively corresponding to two subpixels included in the same subpixel group may be the same.

The per-subpixel group compensation data may be data corresponding to the plurality of subpixel groups, respectively. Each of the plurality of subpixel groups may include subpixels in m rows and n columns. At least one of m and n may be a natural number of 2 or greater, and the other may be a natural number of 1 or greater.

The second compensation data may include a second offset computed on the image data. In other words, the second compensation data may be data (1O) that includes one second offset (1O) which is added to the image data.

The reference compensation data includes the first compensation data (1G1O) and the second compensation data (1O) and thus be data (1G2O) including one gain (1G) and two offsets (2O).

Referring to FIGS. 4 and 5, the compensation processing module 420 included in the display compensation device 11 may perform a compensation processing operation on the display panel 110 only when the first display image DIMG1 displayed on the display panel 110 includes a screen blotch.

The display compensation system 10 according to embodiments of the disclosure performs display compensation processing on a plurality of display devices 100 in such a manner as to perform display compensation processing only on the display device 100 including the display panel 110 where a screen blotch occurs while skipping display compensation processing on the display device 100 including the display panel 110 where no screen blotch occurs, thereby increasing the performance rate of display compensation processing.

Figure 6:
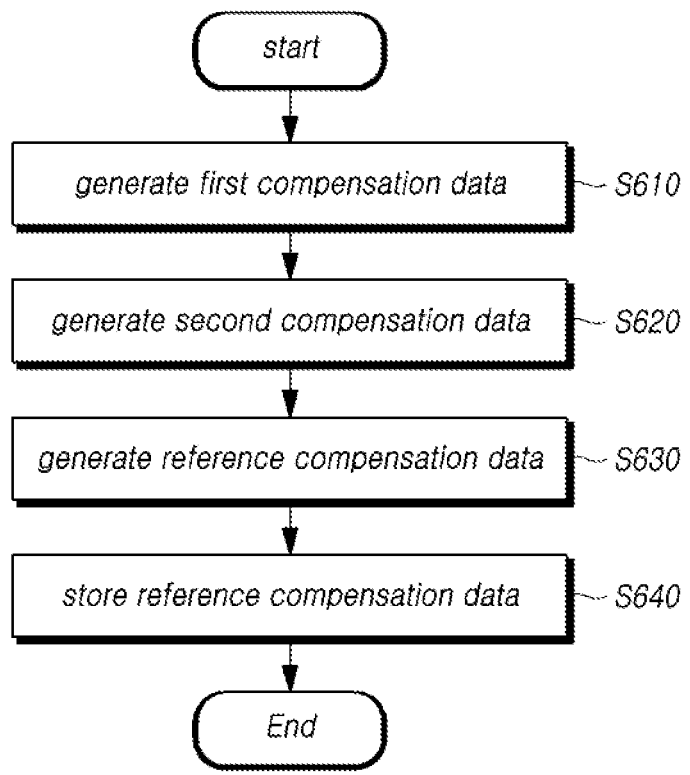
FIG. 6 is a flowchart illustrating a display compensation method according to embodiments of the disclosure.

FIG. 6 is a flowchart illustrating a display compensation method according to embodiments of the disclosure.

Referring to FIG. 6, a display compensation method according to embodiments of the disclosure may include a first step S610 of generating first compensation data including a gain and a first offset based on a first photographed image CIMG1 which is produced by photographing a first display image DIMG1 displayed on the display panel 110, a second step S620 of generating second corrected photographed image data CIMG2' by correcting second photographed image data for a second photographed image CIMG2 which is produced by photographing a second display image DIMG2 displayed on the display panel 110 and generating second compensation data based on the second corrected photographed image data CIMG2', and a third step S630 of generating reference compensation data including the first compensation data and the second compensation data.

Referring to FIG. 6, the first step S610, the second step S620, and the third step S630 may be performed only when the first display image DIMG1 displayed on the display panel 110 contains a screen blotch.

The reference compensation data may be reference data necessary to correct the image data so that the screen blotch is not visible on the display panel 110.

The first display image DIMG1 may be an image having a predetermined first grayscale, and the second display image DIMG2 may be an image having a predetermined second grayscale.

Here, the second grayscale may be lower than the first grayscale. For example, the second grayscale may be included in a previously determined extremely low grayscale range.

The first compensation data may include the gain and first offset computed on the image data. In other words, the first compensation data may be data (1G1O) that includes one gain (1G) which is multiplied with the image data and one first offset (1O) which is added to the image data.

For example, in the first compensation data, one gain (1G) may correspond to a reference compensation value for compensating for the mobility (electron mobility) of the driving transistor DRT included in the corresponding subpixel SP, and one first offset (1O) may correspond to a reference compensation value for compensating for the threshold voltage of the driving transistor DRT included in the corresponding subpixel SP.

For example, the gain and first offset included in the first compensation data may be reference compensation values for eliminating or reducing ghost images.

Each of the first compensation data and the second compensation data may be compensation data that exists, one in each of a plurality of subpixel groups. Each of the plurality of subpixel groups may include subpixels in m rows and n columns. At least one of m and n may be a natural number of 2 or greater, and the other may be a natural number of 1 or greater.

Accordingly, the compensation data respectively corresponding to two subpixels included in the same subpixel group may be the same.

The per-subpixel group compensation data may be data corresponding to the plurality of subpixel groups, respectively. Each of the plurality of subpixel groups may include subpixels in m rows and n columns. At least one of m and n may be a natural number of 2 or greater, and the other may be a natural number of 1 or greater.

The second compensation data may include a second offset computed on the image data. In other words, the second compensation data may be data (1O) that includes one second offset (1O) which is added to the image data.

For example, in the second compensation data, one additionally obtained first offset (1O) may correspond to a reference compensation value for compensating for the threshold voltage of the driving transistor DRT included in the corresponding subpixel SP.

The reference compensation data includes the first compensation data (1G1O) and the second compensation data (1O) and thus be data (1G2O) including one gain (1G) and two offsets (2O).

For example, in the second compensation data, one gain (1G) may correspond to a reference compensation value for compensating for the mobility (electron mobility) of the driving transistor DRT included in the corresponding subpixel SP, and two offsets (2O) including the first and second offsets may correspond to reference compensation values for compensating for the threshold voltage of the driving transistor DRT included in the corresponding subpixel SP.

For example, the gain, first offset, and second offset included in the reference compensation data may be reference compensation values for eliminating or reducing ghost images.

Referring to FIG. 6, the display compensation method according to embodiments of the disclosure may further include a fourth step S640 of storing the reference compensation data 1G2O in the memory MEM of the display device 100 included in the display panel 110.

Figure 7:
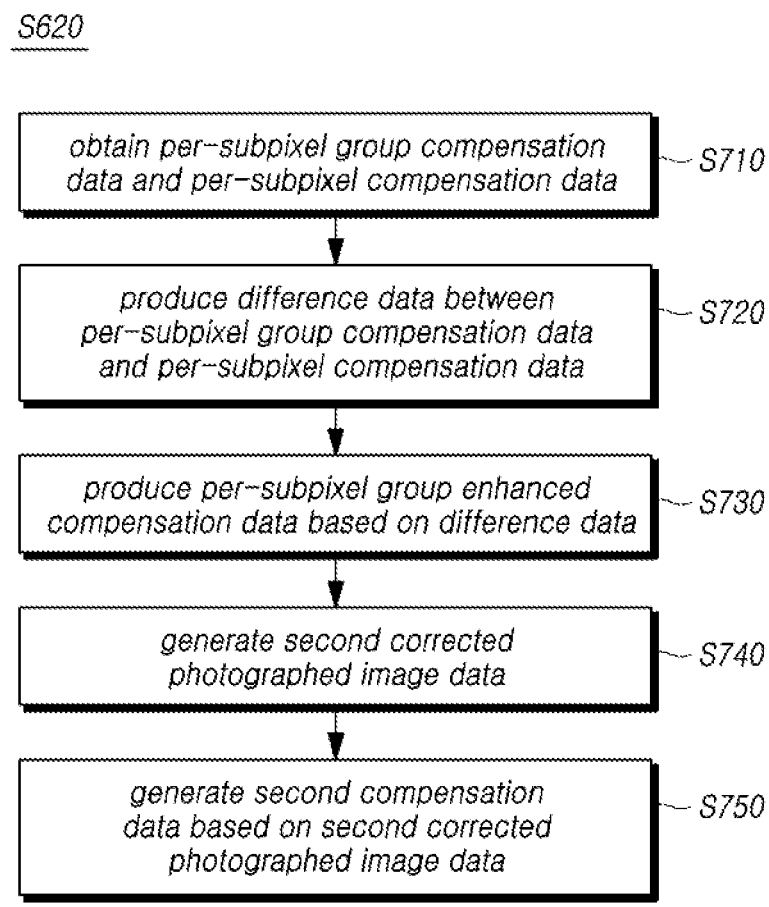
FIGS. 7 and 8 are flowcharts illustrating, in detail, part of a display compensation method according to embodiments of the disclosure.
Figure 8:
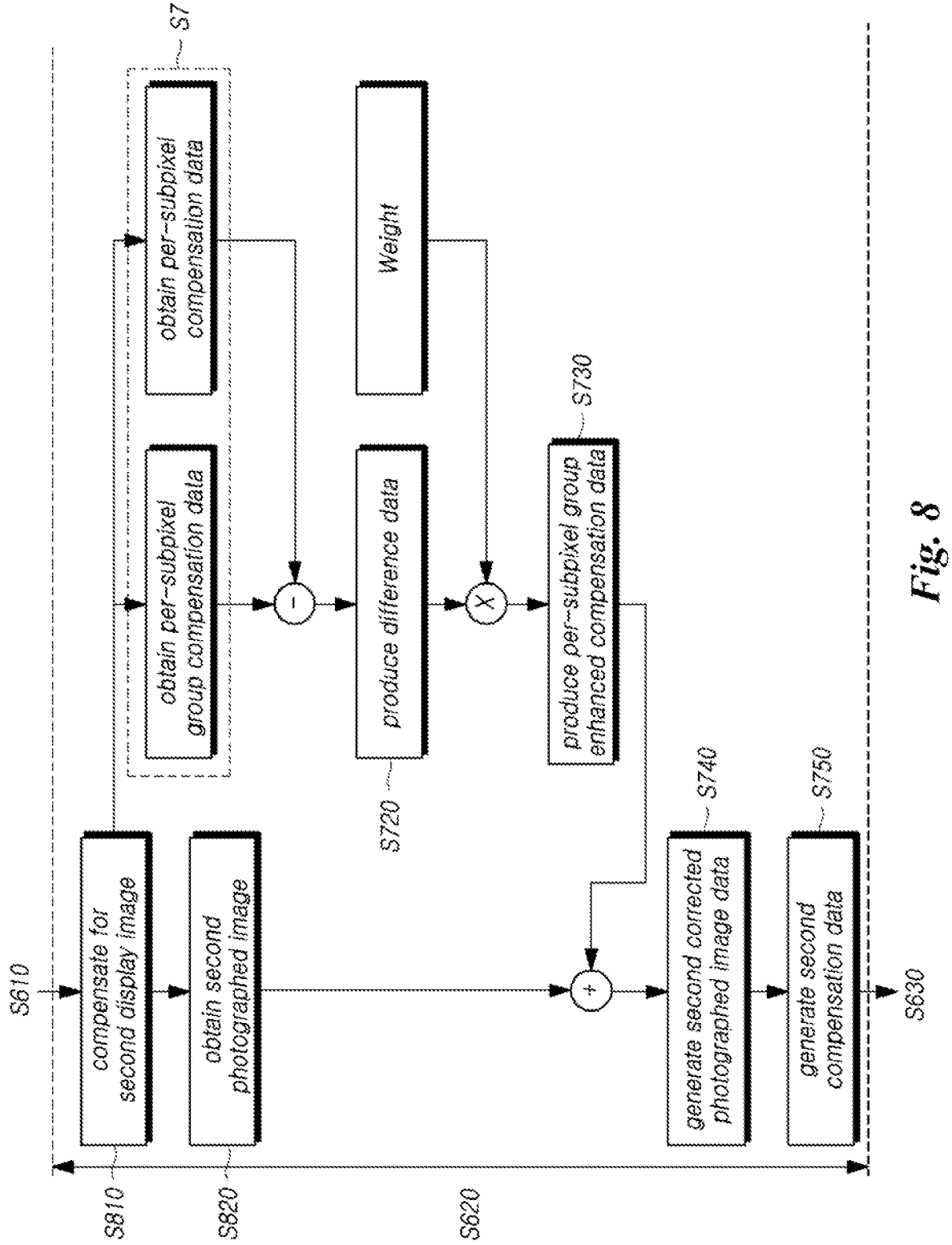

FIGS. 7 and 8 are flowcharts illustrating, in detail, part of a display compensation method according to embodiments of the disclosure.

FIGS. 7 and 8 are flowcharts illustrating, in greater detail, the second step S620 of generating the second compensation data in the display compensation method according to embodiments of the disclosure.

Referring to FIG. 7, the second step S620 of generating the second compensation data in the display compensation method according to embodiments of the disclosure may include a step S710 of obtaining two types of compensation data, a step S720 of producing difference data between the two types of compensation data, a step S730 of producing per-subpixel group enhanced compensation data based on the difference data, a step S740 of generating second corrected photographed image data CIMG2' by correcting second photographed image data for the second photographed image CIMG2, and a step S750 of generating second compensation data based on the second corrected photographed image data CIMG2'.

In greater detail with reference to FIGS. 7 and 8, the second step S620 of generating the second compensation data may be performed as follows.

The display compensation device 11 may obtain (S710) the per-subpixel group compensation data and the per-subpixel compensation data by correcting (S810) the image data for the second display image using the first compensation data generated in step S610. In other words, the display compensation device 11 may obtain the per-subpixel group compensation data and the per-subpixel compensation data for displaying the second display image DIMG2 on the display panel 110 using the first compensation data (S710).

For example, the per-subpixel group compensation data may be one compensation data for 16 subpixels SP arranged in 4 rows and 4 columns.

For example, the one compensation data may be the average of the respective compensation data of the 16 subpixels SP. One compensation data may be a median value among the compensation data for the 16 subpixels SP.

The per-subpixel compensation data may be one compensation data for one subpixel SP.

The display compensation device 11 may produce difference data between the per-subpixel group compensation data and the per-subpixel compensation data (S720).

The display compensation device 11 may produce per-subpixel group enhanced compensation data by modifying the per-subpixel group compensation data based on the difference data (S730).

For example, the display compensation device 11 may produce the per-subpixel group enhanced compensation data by modifying the per-subpixel group compensation data through computation that multiplies the difference data by a predetermined weight (S730).

The display compensation device 11 may obtain the second photographed image CIMG2, produced by photographing the second display image DIMG2 displayed on the display panel 110, through the camera device 12 (S820).

The display compensation device 11 may generate the second corrected photographed image data CIMG2' by correcting the second photographed image data for the second photographed image CIMG2 based on the per-subpixel group enhanced compensation data (S740).

The display compensation device 11 may generate the second compensation data based on the second corrected photographed image data CIMG2' which is produced by correcting the second photographed image CIMG2 instead of the second photographed image CIMG2.

Accordingly, the display compensation device 11 may obtain the second compensation data capable of eliminating screen glitches that may not be removed with the first compensation data.

For example, the screen glitches may include, e.g., discoloration or blotch on the screen, or a phenomenon where something displayed on the screen looks different from the real.

After the second compensation data is generated in step S620, the display compensation device 11 may include the reference compensation data including the first compensation data generated in step S610 and the second compensation data generated in step S620. For example, the reference compensation data may include one gain and two offsets.

The controller 140 of the display device 100 may modify the image data using the reference compensation data before supplying the image data to the data driving circuit 120 and then supply it to the data driving circuit 120.

The controller 140 may perform computation (G×Data+ O1+O2) that multiplies the original image data Data by the gain G included in the reference compensation data (G×Data) and then adds the two offsets O1 and O2 included in the reference compensation data.

When an element (e.g., light emitting element or driving transistor) included in the subpixel SP is degraded, the controller 140 may detect the degradation of the element through sensing driving on the subpixel SP and produce compensation data for reducing degradation deviation between elements.

For example, the compensation data may be a value newly produced based on the value sensed through sensing driving, and the compensation data may be a value produced by correcting the reference compensation data based on the value sensed through sensing driving.

An example of using the reference compensation data generated by the display compensation device 11 and stored in the memory MEM of the display device 100 in the display device according to embodiments of the disclosure is described below.

Figure 9:
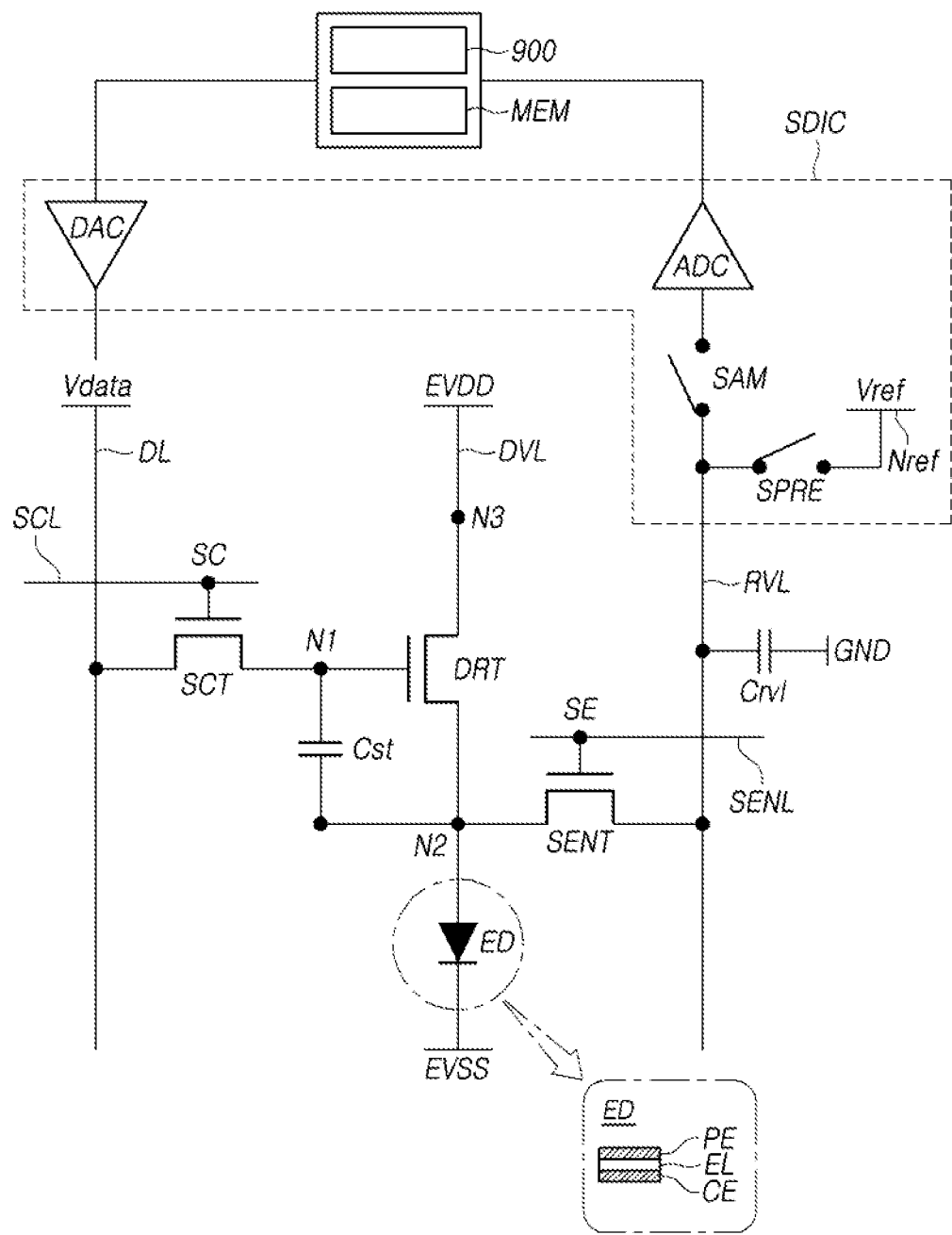
FIG. 9 is a view illustrating a compensation circuit of a display device according to embodiments of the disclosure.

FIG. 9 is a view illustrating a compensation circuit of a display device 100 according to embodiments of the disclosure.

Referring to FIG. 9, the compensation circuit is a circuit capable of sensing and compensation processing on characteristic values of circuit elements in the subpixel SP.

The compensation circuit may be connected to the subpixel SP and may include a power switch SPRE, a sampling switch SAM, an analog-to-digital converter ADC, and a compensator 900.

The power switch SPRE may control the connection between the reference voltage line RVL and the reference voltage supply node Nref. The reference voltage Vref output from the power supply may be supplied to the reference voltage supply node Nref, and the reference voltage Vref supplied to the reference voltage supply node Nref may be applied to the reference voltage line RVL through the power switch SPRE.

The sampling switch SAM may control a connection between the analog-to-digital converter ADC and the reference voltage line RVL. If connected to the reference voltage line RVL by the sampling switch SAM, the analog-to-digital converter ADC may convert the voltage (analog voltage) of the connected reference voltage line RVL into a sensing value corresponding to a digital value.

A line capacitor Crvl may be formed between the reference voltage line RLV and the ground GND. The voltage of the reference voltage line RVL may correspond to the charge amount of the line capacitor Crvl.

The analog-to-digital converter ADC may provide sensing data including a sensing value to the compensator 900.

The compensator 900 may find out the characteristic value of the light emitting element ED or the driving transistor DRT included in the corresponding subpixel SP based on the sensing data, calculate a compensation value, and store it in the memory MEM. For example, the compensation value is information for reducing a deviation in characteristic value between the light emitting elements ED or a deviation in characteristic value between the driving transistors DRT and may include an offset and a gain value for data change.

The display controller 140 may change the image data using the compensation value stored in the memory MEM and may supply the changed image data to the data driving circuit 120.

The reference compensation data generated by the display compensation device 11 according to embodiments of the disclosure may be stored in the memory MEM and, after the display device 100 is shipped, the reference compensation data may be used for display driving.

Further, when the compensation value is calculated by the compensator 900 after the compensation processing is performed by the display device 100, the reference compensation data stored in the memory MEM may be used.

Further, after the compensation processing is performed by the display device 100, the reference compensation data may be changed by the compensation value newly calculated by the compensator 900.

The data driving circuit 120 may convert the changed image data into a data voltage Vdata corresponding to the analog voltage using the digital-to-analog converter DAC and output the data voltage Vdata. Accordingly, compensation may be realized.

Referring to FIG. 9, the analog-to-digital converter ADC, the power switch SPRE, and the sampling switch SAM may be included in the source driver integrated circuit SDIC included in the data driving circuit 120. The compensator 900 may be included in the display controller 140.

As described above, the display device 100 according to embodiments of the disclosure may perform compensation processing to reduce a deviation in characteristic value between the driving transistors DRT. To perform compensation processing, the display device 100 may perform sensing driving to detect the deviation in characteristic value between the driving transistors DRT.

The display device 100 according to embodiments of the disclosure may perform sensing driving in two modes (fast mode and slow mode). Sensing driving in the two modes (fast mode and slow mode) is described below with reference to FIGS. 10A and 11B.

Figure 10:
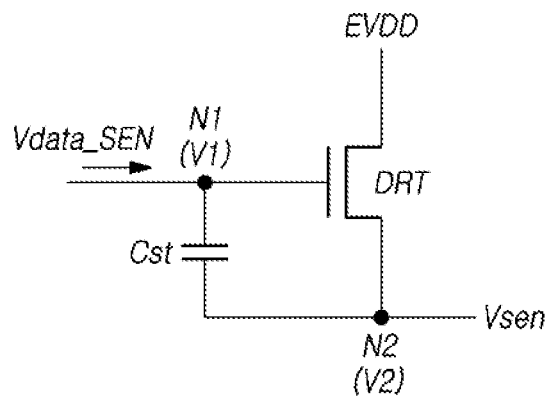
FIG. 10 is a diagram illustrating a first sensing mode of a display device according to embodiments of the disclosure.
Figure 10:
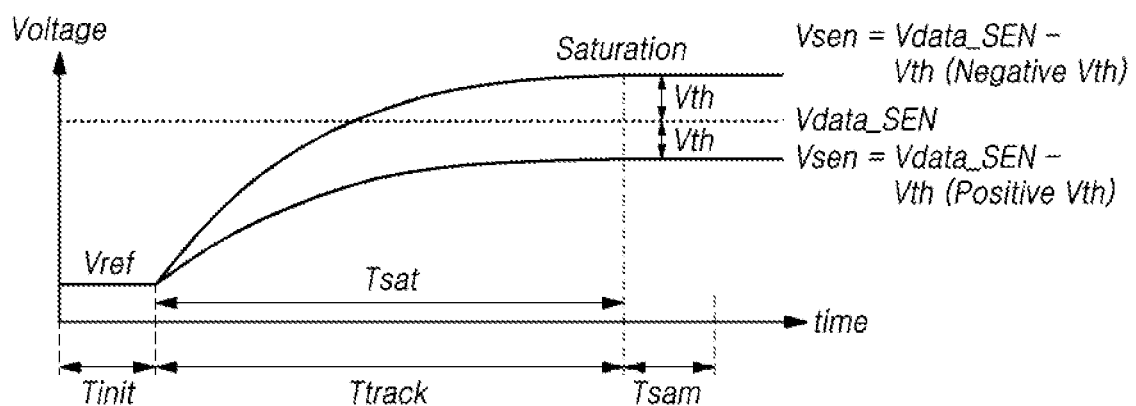
Figure 11:
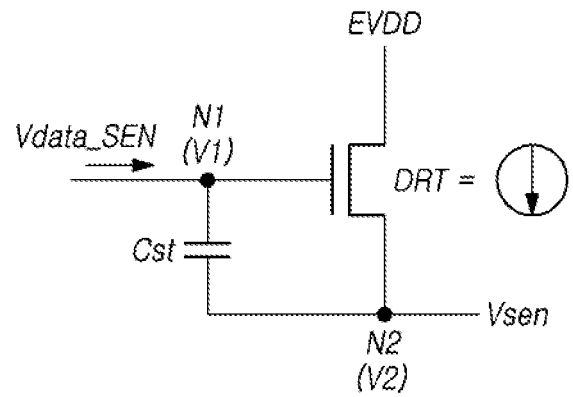
FIG. 11 is a diagram illustrating a second sensing mode of a display device according to embodiments of the disclosure.
Figure 11:
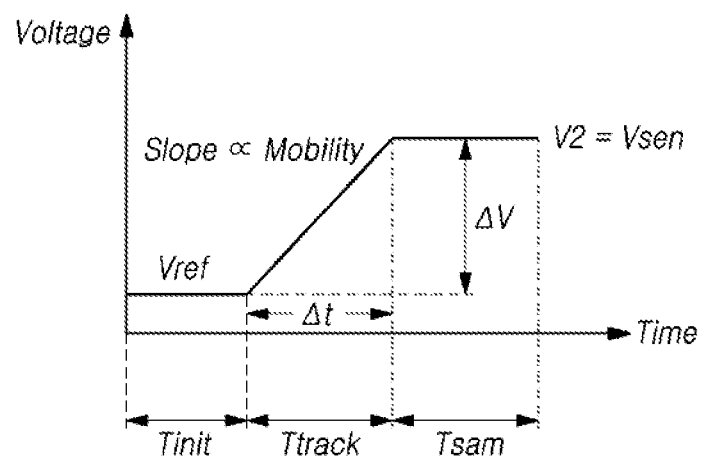

FIG. 10 is a diagram for a first sensing mode S-Mode of the display device 100 according to embodiments of the disclosure. FIG. 11 is a diagram for a second sensing mode F-Mode of the display device 100 according to embodiments of the disclosure.

Referring to FIG. 10, the first sensing mode S-Mode is a sensing driving mode for slowly sensing the characteristic value (e.g., threshold voltage) requiring a relatively long driving time among the characteristic values (e.g., threshold voltage and mobility) of the driving transistor DRT. The first sensing mode S-Mode may also be referred to as a slow mode or a threshold voltage sensing mode.

Referring to FIG. 11, the second sensing mode F-Mode is a sensing driving mode for quickly sensing the characteristic value (e.g., mobility) requiring a relatively short driving time among the characteristic values (e.g., threshold voltage and mobility) of the driving transistor DRT. The second sensing mode F-Mode may also be referred to as a fast mode or a mobility sensing mode.

Referring to FIGS. 10 and 11, the sensing driving period of the first sensing mode S-Mode and the sensing driving period of the second sensing mode F-Mode, each, may include an initialization period Tinit, a tracking period Ttrack, and a sampling period Tsam. The first sensing mode S-Mode and the second sensing mode F-Mode each are described below.

The sensing driving period of the first sensing mode S-Mode of the display device 100 is described below with reference to FIG. 10.

Referring to FIG. 10, the initialization period Tinit of the sensing driving period of the first sensing mode S-Mode is a period for initializing the first node N1 and the second node N2 of the driving transistor DRT.

During the initialization period Tinit, the voltage V1 of the first node N1 of the driving transistor DRT may be initialized as a sensing driving data voltage Vdata_SEN, and the voltage V2 of the second node N2 of the driving transistor DRT may be initialized as a sensing driving reference voltage Vref.

During the initialization period Tinit, the scan transistor SCT and the sense transistor SENT may be turned on, and the power switch SPRE may be turned on.

Referring to FIG. 10, the tracking period Ttrack of the sensing driving period of the first sensing mode S-Mode is a period for tracking the voltage V2 of the second node N2 of the driving transistor DRT reflecting the threshold voltage Vth of the driving transistor DRT or a change therein.

During the tracking period Ttrack, the power switch SPRE may be turned off, or the sense transistor SENT may be turned off.

Accordingly, during the tracking period Ttrack, the first node N1 of the driving transistor DRT is in a constant voltage state of having the sensing driving data voltage Vdata_SEN, but the second node N2 of the driving transistor DRT may be in an electrically floating state. Accordingly, during the tracking period Ttrack, the voltage V2 of the second node N2 of the driving transistor DRT may be varied.

During the tracking period Ttrack, the voltage V2 of the second node N2 of the driving transistor DRT may increase until the voltage V2 of the second node N2 of the driving transistor DRT reflects the threshold voltage Vth of the driving transistor DRT.

During the initialization period Tinit, the voltage difference between the first node N1 and second node N2 of the initialized driving transistor DRT may be the threshold voltage Vth of the driving transistor DRT or more. Accordingly, when the tracking period Ttrack starts, the driving transistor DRT is in a turn-on state and conducts current. Accordingly, if the tracking period Ttrack starts, the voltage V2 of the second node N2 of the driving transistor DRT may increase.

During the tracking period Ttrack, the voltage V2 of the second node N2 of the driving transistor DRT does not steadily increase.

To the end of the tracking period Ttrack, the width at which the voltage of the second node N2 of the driving transistor DRT increase may be reduced and, resultantly, the voltage V2 of the second node N2 of the driving transistor DRT may be saturated.

The saturated voltage V2 of the second node N2 of the driving transistor DRT may correspond to the difference Vdata_SEN−Vth between the data voltage Vdata_SEN and the threshold voltage Vth or the difference Vdata_SEN−ΔVth between the data voltage Vdata_SEN and the threshold voltage deviation ΔVth. Here, the threshold voltage Vth may be a negative threshold voltage (Negative Vth) or a positive threshold voltage (Positive Vth).

If the voltage V2 of the second node N2 of the driving transistor DRT is saturated, the sampling period Tsam may be started.

Referring to FIG. 10, the sampling period Tsam of the sensing driving period of the first sensing mode S-Mode is a period for measuring the voltage (Vdata_SEN−Vth, Vdata_SEN−ΔVth) reflecting the threshold voltage Vth of the driving transistor DRT or a change therein.

The sampling period Tsam of the sensing driving period of the first sensing mode S-Mode is a step in which the analog-to-digital converter ADC senses the voltage of the reference voltage line RVL. The voltage of the reference voltage line RVL may correspond to the voltage V2 of the second node N2 of the driving transistor DRT and correspond to the charged voltage of the line capacitor Crvl formed in the reference voltage line RVL.

During the sampling period Tsam, the voltage Vsen sensed by the analog-to-digital converter ADC is the voltage Vdata_SEN−Vth which is the data voltage Vdata_SEN minus the threshold voltage Vth or the voltage Vdata_SEN−ΔVth which is the data voltage Vdata_SEN minus the threshold voltage deviation ΔVth. Here, Vth may be a positive threshold voltage or a negative threshold voltage.

Referring to FIG. 10, during the tracking period Ttrack of the sensing driving period of the first sensing mode S-Mode, the saturation time Tsat taken for the voltage V2 of the second node N2 of the driving transistor DRT to be increased and saturated may be a temporal length of the tracking period Ttrack of the sensing driving period of the first sensing mode S-Mode and may be a time taken for the threshold voltage Vth of the driving transistor DRT or a change therein to be reflected to the voltage V2 (V2=Vdata_SEN−Vth) of the second node N2 of the driving transistor DRT.

The saturation time Tsat may occupy most of the overall temporal length of the sensing driving period of the first sensing mode S-Mode. In the first sensing mode S-Mode, it may take a quite long time (saturation time: Tsat) for the voltage V2 of the second node N2 of the driving transistor DRT to be increased and saturated.

As described above, the sensing driving scheme for sensing the threshold voltage of the driving transistor DRT requires a long saturation time Tsat until the voltage state of the second node N2 of the driving transistor DRT indicates the threshold voltage of the driving transistor DRT and is thus referred to as a slow mode (first sensing mode S-Mode).

The sensing driving period of the second sensing mode F-Mode of the display device 100 is described with reference to FIG. 11.

Referring to FIG. 11, the initialization period Tinit of the sensing driving period of the second sensing mode F-Mode is a period for initializing the first node N1 and the second node N2 of the driving transistor DRT.

During the initialization period Tinit, the scan transistor SCT and the sense transistor SENT may be turned on, and the power switch SPRE may be turned on.

During the initialization period Tinit, the voltage V1 of the first node N1 of the driving transistor DRT may be initialized as a sensing driving data voltage Vdata_SEN, and the voltage V2 of the second node N2 of the driving transistor DRT may be initialized as a sensing driving reference voltage Vref.

Referring to FIG. 11, the tracking period Ttrack of the sensing driving period of the second sensing mode F-Mode is a period during which the voltage V2 of the second node N2 of the driving transistor DRT is changed during a preset tracking time Δt until the voltage V2 of the second node N2 of the driving transistor DRT becomes a voltage state of reflecting the mobility of the driving transistor DRT or a change in mobility.

During the tracking period Ttrack, the preset tracking time Δt may be set to be short. Accordingly, during the short tracking time Δt, it is hard for the voltage V2 of the second node N2 of the driving transistor DRT to reflect the threshold voltage Vth. However, during the short tracking time Δt, the voltage V2 of the second node N2 of the driving transistor DRT may be changed in such an extent as to be able to figure out the mobility of the driving transistor DRT.

Accordingly, the second sensing mode F-Mode is a sensing driving scheme for sensing the mobility of the driving transistor DRT.

In the tracking period Ttrack, as the power switch SPRE is turned off or the sense transistor SENT is turned off, the second node N2 of the driving transistor DRT may become an electrically floating state.

During the tracking period Ttrack, by the scan signal SC of the turn-off level voltage, the scan transistor SCT may be in a turned-off state, and the first node N1 of the driving transistor DRT may be in a floating state.

During the initialization period Tinit, the voltage difference between the first node N1 and second node N2 of the initialized driving transistor DRT may be the threshold voltage Vth of the driving transistor DRT or more. Accordingly, when the tracking period Ttrack starts, the driving transistor DRT is in a turn-on state and conducts current.

If the first node N1 and second node N2 of the driving transistor DRT are the gate node and source node, respectively, the voltage difference between the first node N1 and second node N2 of the driving transistor DRT becomes Vgs.

Accordingly, during the tracking period Ttrack, the voltage V2 of the second node N2 of the driving transistor DRT may be increased. In this case, the voltage V1 of the first node N1 of the driving transistor DRT may also be increased.

During the tracking period Ttrack, the increasing rate of the voltage V2 of the second node N2 of the driving transistor DRT is varied depending on the current capability (i.e., mobility) of the driving transistor DRT. As the current capability (mobility) of the driving transistor DRT increases, the voltage V2 of the second node N2 of the driving transistor DRT may be further sharply increased.

After the tracking period Ttrack proceeds the preset tracking time Δt, i.e., after the voltage V2 of the second node N2 of the driving transistor DRT rises during the preset tracking time Δt, the sampling period Tsam may proceed.

During the tracking period Ttrack, the increasing rate of the voltage V2 of the second node N2 of the driving transistor DRT corresponds to the voltage variation ΔV of the second node N2 of the driving transistor DRT during the preset tracking time Δt. The voltage variation Δt of the second node N2 of the driving transistor DRT may correspond to the voltage variation of the reference voltage line RVL.

Referring to FIG. 11, after the tracking period Ttrack proceeds the preset tracking time Δt, the sampling period Tsam may begin. During the sampling period Tsam, the sampling switch SAM may be turned on, so that the reference voltage line RVL and the analog-to-digital converter ADC may be electrically connected with each other.

The analog-to-digital converter ADC may sense the voltage of the reference voltage line RVL. The voltage Vsen sensed by the analog-to-digital converter ADC may be the voltage Vref+ΔV which is the reference voltage Vref plus an increment during the preset tracking time Δt, i.e., the voltage variation Δt.

The voltage Vsen sensed by the analog-to-digital converter ADC may be the voltage of the reference voltage line RVL and may be the voltage of the second node N2 electrically connected with the reference voltage line RVL through the sense transistor SENT.

Referring to FIG. 11, in the sampling period Tsam of the sensing driving period of the second sensing mode F-Mode, the voltage Vsen sensed by the analog-to-digital converter ADC may be varied depending on the mobility of the driving transistor DRT. As the mobility of the driving transistor DRT increases, the sensing voltage Vsen increases. As the mobility of the driving transistor DRT decreases, the sensing voltage Vsen decreases.

As described above, the sensing driving scheme for sensing the mobility of the driving transistor DRT may change the voltage of the second node N2 of the driving transistor DRT only for a short time Δt and is thus called a fast mode (second sensing mode F-Mode).

Referring to FIG. 10, the display device 100 according to embodiments of the disclosure may figure out the threshold voltage Vth of the driving transistor DRT, or a change therein, in the corresponding subpixel SP based on the voltage Vsen sensed through the first sensing mode S-Mode, calculate the threshold voltage compensation value of reducing or removing the threshold voltage deviation between the driving transistors DRT, and store the calculated threshold voltage compensation value in the memory MEM.

Referring to FIG. 11, the display device 100 according to embodiments of the disclosure may figure out the mobility of the driving transistor DRT, or a change therein, in the corresponding subpixel SP based on the voltage Vsen sensed through the second sensing mode F-Mode, calculate the mobility compensation value of reducing or removing the mobility deviation between the driving transistors DRT, and store the calculated mobility compensation value in the memory MEM.

When supplying the data voltage Vdata for display driving to the corresponding subpixel SP, the display device 100 may supply the data voltage Vdata changed based on the threshold voltage compensation value and the mobility compensation value.

According to the foregoing description, the threshold voltage sensing, by the nature of requiring a long sensing time, may proceed in the first sensing mode S-Mode, and the mobility sensing, by the nature that a short sensing time suffices, may proceed in the second sensing mode F-Mode.

Figure 12:
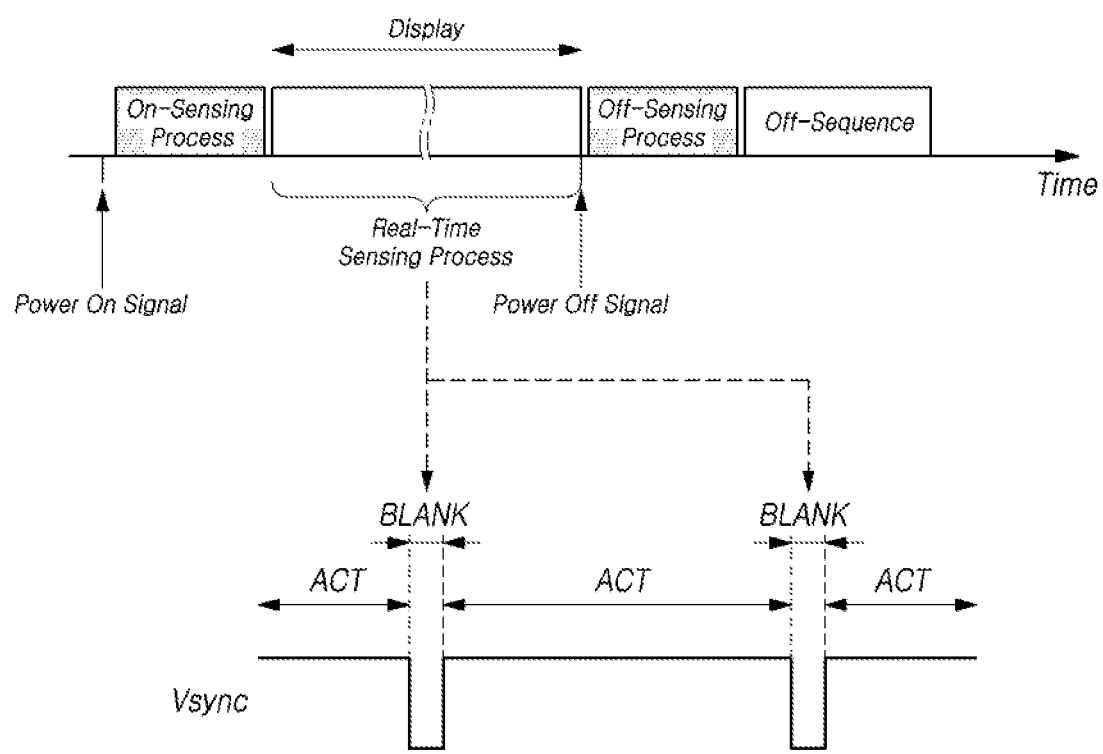
FIG. 12 is a view illustrating various sensing timings of a display device according to embodiments of the disclosure.

FIG. 12 is a view illustrating various sensing timings of a display device 100 according to embodiments of the disclosure.

Referring to FIG. 12, the display device 100 according to embodiments of the disclosure may sense the characteristic value of the driving transistor DRT in each subpixel SP disposed in the display panel 110 if a power on signal is generated. Such sensing process is referred to as an "on-sensing process."

Referring to FIG. 12, the display device 100 according to embodiments of the disclosure may sense the characteristic value of the driving transistor DRT in each subpixel SP disposed in the display panel 110 before an off sequence, such as power off, proceeds if a power off signal is generated. Such sensing process is referred to as an "off-sensing process."

Referring to FIG. 12, the display device 100 according to embodiments of the disclosure may sense the characteristic value of the driving transistor DRT in each subpixel SP during display driving until before a power off signal is generated after a power on signal is generated. Such sensing process is referred to as a "real-time sensing process."

Such real-time sensing process may be performed every blank time BLANK between the active times ACT with respect to the vertical sync signal Vsync.

Since the mobility sensing of the driving transistor DRT requires only a short time, the mobility sensing may proceed in the second sensing mode F-Mode among sensing driving schemes.

The mobility sensing that may proceed in the second sensing mode F-Mode which is the fast mode requires only a short time, so that mobility sensing may proceed in any one of the on-sensing process, off-sensing process, and real-time sensing process.

For example, the mobility sensing which may proceed in the second sensing mode F-Mode which is the fast mode may proceed in the real-time sensing process that may reflect changes in mobility in real-time during display driving. In other words, the mobility sensing may proceed every blank period during display driving.

In contrast, the threshold voltage sensing of the driving transistor DRT requires a long saturation time Tsat. Accordingly, the threshold voltage sensing may proceed in the first sensing mode S-Mode among the sensing driving schemes.

The threshold voltage sensing should be performed using a timing when the user's viewing is not disturbed. Accordingly, the threshold voltage sensing of the driving transistor DRT may proceed while display driving is not done (i.e., the circumstance where the user does not intend to view) after a power off signal is generated according to, e.g., a user input. In other words, the threshold voltage sensing may proceed in the off-sensing process.

The foregoing embodiments are briefly described below.

A display compensation device according to embodiments of the disclosure may include an image acquisition module that obtains a photographed image by photographing the display image displayed on the display panel and a compensation processing module that generates the compensation data for compensating for the image data for driving the display panel based on the photographed image.

The compensation processing module may generate first compensation data based on a first photographed image produced by photographing a first display image displayed on the display panel, generate second corrected photographed image data by correcting second photographed image data for a second photographed image produced by photographing a second display image displayed on the display panel and generating second compensation data based on the second corrected photographed image data, and generate reference compensation data including the first compensation data and the second compensation data.

The display compensation device according to embodiments of the disclosure may further comprise a storage processing module storing the reference compensation data in a memory associated with the display panel.

The compensation processing module of the display compensation device according to embodiments of the disclosure may obtain difference data between per-subpixel group compensation data and per-subpixel compensation data for displaying the second display image on the display panel using the first compensation data, obtain per-subpixel group enhanced compensation data produced by modifying the per-subpixel group compensation data based on the difference data, generate the second corrected photographed image data by correcting the second photographed image data based on the per-subpixel group enhanced compensation data, and generate the second compensation data based on the second corrected photographed image data.

The first display image may be an image having a predetermined first grayscale, and the second display image may be an image having a second grayscale different from the first grayscale.

The second grayscale may be lower than the first grayscale.

The second grayscale may be included in a previously determined extremely low grayscale range.

The first compensation data may include the gain and first offset computed on the image data.

Each of the first compensation data and the second compensation data may be compensation data that exists, one in each of a plurality of subpixel groups. Each of the plurality of subpixel groups may include subpixels in m rows and n columns. Here, at least one of m and n may be a natural number of 2 or greater, and the other may be a natural number of 1 or greater.

The per-subpixel group compensation data may be data corresponding to the plurality of subpixel groups, respectively. Each of the plurality of subpixel groups may include subpixels in m rows and n columns. Here, at least one of m and n may be a natural number of 2 or greater, and the other may be a natural number of 1 or greater.

The second compensation data may include a second offset computed on the image data.

The compensation processing module may operate only when the first display image displayed on the display panel includes a blotch.

The display panel may include a plurality of subpixels (see FIG. 3A or 3B). Each of the plurality of subpixels may include a light emitting element and a transistor (e.g., a driving transistor). For example, the reference compensation data may have a different value (e.g., different gain, different first offset, or different second offset) depending on the magnitude of the characteristic value (e.g., threshold voltage or mobility) of at least one of the light emitting element and transistor (e.g., driving transistor).

A display compensation method according to embodiments of the disclosure may comprise a first step of generating first compensation data including a gain and a first offset based on a first photographed image produced by photographing a first display image displayed on a display panel, a second step of generating second compensation data based on a second photographed image produced by photographing a second display image displayed on the display panel, and a third step of generating reference compensation data including the first compensation data and the second compensation data. Here, the second display image may be an image different from the first display image.

The first step, the second step, and the third step included in the display compensation method according to embodiments of the disclosure may be performed only when the first display image displayed on the display panel contains a blotch.

In the second step included in the display compensation method according to embodiments of the disclosure, the display compensation device may generate second corrected photographed image data by correcting second photographed image data for a second photographed image produced by photographing a second display image displayed on the display panel and generate second compensation data based on the second corrected photographed image data.

The second step may include obtaining per-subpixel group compensation data and per-subpixel compensation data for displaying the second display image on the display panel using the first compensation data, producing difference data between the per-subpixel group compensation data and the per-subpixel compensation data, producing per-subpixel group enhanced compensation data produced by modifying the per-subpixel group compensation data based on the difference data, generating second corrected photographed image data by correcting the second photographed image data for the second photographed image obtained by photographing the second display image displayed on the display panel, based on the per-subpixel group enhanced compensation data, and generating the second compensation data based on the second corrected photographed image data.

The first display image may be an image having one or more predetermined first grayscales. The second display image may be an image different from the first display image and having a second grayscale different from the first grayscale.

The second grayscale may be lower than the first grayscale.

The second grayscale may be included in a previously determined extremely low grayscale range.

The first compensation data may include a gain and a first offset.

Each of the first compensation data and the second compensation data may be compensation data that exists, one in each of a plurality of subpixel groups. Each of the plurality of subpixel groups may include subpixels in m rows and n columns. Here, at least one of m and n may be a natural number of 2 or greater, and the other may be a natural number of 1 or greater.

The per-subpixel group compensation data may be data corresponding to the plurality of subpixel groups, respectively. Each of the plurality of subpixel groups may include subpixels in m rows and n columns. Here, at least one of m and n may be a natural number of 2 or greater, and the other may be a natural number of 1 or greater.

The second compensation data may include a second offset.

The display compensation method according to embodiments of the disclosure may further comprise a fourth step of storing the reference compensation data in a memory of a display device including the display panel.

Here, the display panel may include a plurality of subpixels (see FIG. 3A or 3B). Each of the plurality of subpixels may include a light emitting element and a transistor (e.g., a driving transistor). For example, the reference compensation data may have a different value (e.g., different gain, different first offset, or different second offset) depending on the magnitude of the characteristic value (e.g., threshold voltage or mobility) of at least one of the light emitting element and transistor (e.g., driving transistor).

Embodiments of the disclosure described above may repeatedly perform compensation data generation processing to finally generate the reference compensation data, which presents the effect of accurately generating the reference compensation data that accurately reflects the state of the panel at the time the panel is manufactured.

Embodiments of the disclosure have the effect of generating reference compensation data that may reduce or eliminate screen glitches in the display panel by generating reference compensation data using images at various grayscales, including an extremely low grayscale range where screen abnormalities are induced.

Embodiments of the disclosure may accurately generate reference compensation data to eliminate screen glitches, thereby significantly reducing the number of discarded display panels while increasing the yield of high-quality display panels.

Embodiments of the disclosure may increase the yield of high-quality display panels for the same material input, thereby saving production energy and power consumption when manufacturing the display devices and hence leading to low power consumption and process optimization.

Embodiments of the disclosure may selectively perform the display compensation processing only for the display devices in which the screen smudge occurs, thereby saving power and increasing performance rate when performing display compensation processing on a plurality of display devices.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display compensation device, comprising:
an image acquisition module configured to obtain a photographed image of a display image displayed on a display panel; and
a compensation processing module configured to generate compensation data for compensating for image data for driving the display panel, based on the photographed image, wherein in operation the compensation processing module:
generates first compensation data based on a first photographed image of a first display image displayed on the display panel,
obtains a second photographed image of a second display image displayed on the display panel,
generates a second photographed image data by correcting the second photographed image,
obtains difference data between per-subpixel group compensation data and per-subpixel compensation data for displaying the second display image on the display panel using the first compensation data,
obtains per-subpixel group enhanced compensation data produced by modifying the per-subpixel group compensation data based on the difference data,
generates the second corrected photographed image data by correcting the second photographed image data based on the per-subpixel group enhanced compensation data, and
generates the second compensation data based on the second corrected photographed image data, and
generates reference compensation data including the first compensation data and the second compensation data.

2. The display compensation device of claim 1, further comprising a storage processing module storing the reference compensation data in a memory associated with the display panel.

3. The display compensation device of claim 1, wherein the first display image is an image having one or more predetermined first grayscales, and the second display image is an image having a second grayscale different from the first grayscales, and wherein the second grayscale is a grayscale lower than the predetermined one or more first grayscales.

4. The display compensation device of claim 3, wherein the second grayscale is included in a predetermined grayscale range.

5. The display compensation device of claim 1, wherein the display panel includes a plurality of subpixels,
wherein each of the plurality of subpixels includes a light emitting element and a transistor, and
wherein the reference compensation data has a different value based on a magnitude of a characteristic value of at least one of the light emitting element and the transistor.

6. The display compensation device of claim 1, wherein each of the first compensation data and the second compensation data is compensation data that exists in each of a plurality of subpixel groups, and
wherein each of the plurality of subpixel groups includes subpixels in m rows and n columns, wherein one of m or n is a natural number of 2 or greater, and another one of m or n is a natural number of 1 or greater.

7. The display compensation device of claim 1, wherein the per-subpixel group compensation data is data corresponding to the plurality of subpixel groups, respectively, and
wherein each of the plurality of subpixel groups includes subpixels in m rows and n columns, wherein one of m or n is a natural number of 2 or greater, and another one of m or n is a natural number of 1 or greater.

8. The display compensation device of claim 1, wherein the first compensation data includes a gain and a first offset on the image data, and the second compensation data includes a second offset on the image data.

9. The display compensation device of claim 1, wherein the compensation processing module operates only when the first display image displayed on the display panel includes a blotch.

10. A display compensation method, comprising:
a first act of generating first compensation data including a gain and a first offset based on a first photographed image of a first display image displayed on a display panel;
a second act of generating second compensation data based on a second photographed image of a second display image, different from the first display image, displayed on the display panel; and
a third act of generating reference compensation data including the first compensation data and the second compensation data,
wherein the second act includes:
obtaining per-subpixel group compensation data and per-subpixel compensation data for displaying the second display image on the display panel using the first compensation data;
producing difference data between the per-subpixel group compensation data and the per-subpixel compensation data;
producing per-subpixel group enhanced compensation data by modifying the per-subpixel group compensation data based on the difference data;
generating corrected second photographed image data by correcting the second photographed image data for the second photographed image of the second display image displayed on the display panel, based on the per-subpixel group enhanced compensation data; and
generating the second compensation data based on the corrected second photographed image data.

11. The display compensation method of claim 10, wherein the first act, the second act, and the third act are performed only in response to the first display image displayed on the display panel including a blotch.

12. The display compensation method of claim 10, wherein in the second act, a display compensation device generates corrected second photographed image data by correcting second photographed image data for the second photographed image of the second display image displayed on the display panel and generates the second compensation data based on the corrected second photographed image data.

13. The display compensation method of claim 10, wherein the first display image is an image having one or more predetermined first grayscales, and the second display image is an image having a second grayscale lower than the one or more predetermined first grayscales.

14. The display compensation method of claim 10, wherein the second grayscale is included in a predetermined grayscale range.

15. The display compensation method of claim 10, wherein each of the first compensation data and the second compensation data is compensation data that is present for each of a plurality of subpixel groups, wherein each of the plurality of subpixel groups includes subpixels in m rows and n columns, and wherein one of m or n is a natural number of two or greater, and another one of m or n is a natural number of 1 or greater.

16. The display compensation method of claim 10, wherein the first compensation data includes a gain and a first offset, and the second compensation data includes a second offset.

17. The display compensation method of claim 10, wherein the per-subpixel group compensation data is data corresponding to each of a plurality of subpixel groups, wherein each of the plurality of subpixel groups includes subpixels in m rows and n columns, and wherein one of m or n is a natural number of two or greater, and another one of m or n is a natural number of 1 or greater.

18. The display compensation method of claim 10, further comprising a fourth act of storing the reference compensation data in a memory of a display device including the display panel.

\* \* \* \* \*